United States Patent
Kirby et al.

(10) Patent No.: US 10,069,294 B2
(45) Date of Patent: Sep. 4, 2018

(54) AC-CURRENT INDUCED QUENCH PROTECTION SYSTEM

(71) Applicant: CERN—EUROPEAN ORGANIZATION FOR NUCLEAR RESEARCH, Génèva (CH)

(72) Inventors: Glyn Alistair Kirby, Sauverny (FR); Vladimir Datskov, Prevessin-Moens (FR); Emmanuele Ravaioli, Geneva (CH)

(73) Assignee: CERN—EUROPEAN ORGANIZATION FOR NUCLEAR RESEARCH (CH)

(*) Notice: Subject to any disclaimer, the term of this patent is extended or adjusted under 35 U.S.C. 154(b) by 163 days.

(21) Appl. No.: 14/900,856

(22) PCT Filed: Jun. 26, 2014

(86) PCT No.: PCT/EP2014/063575
§ 371 (c)(1),
(2) Date: Dec. 22, 2015

(87) PCT Pub. No.: WO2014/207130
PCT Pub. Date: Dec. 31, 2014

(65) Prior Publication Data
US 2016/0156174 A1    Jun. 2, 2016

(30) Foreign Application Priority Data

Jun. 28, 2013   (EP) .................................... 13174323

(51) Int. Cl.
*H02H 7/00* (2006.01)
*H01F 6/02* (2006.01)

(52) U.S. Cl.
CPC .............. *H02H 7/001* (2013.01); *H01F 6/02* (2013.01); *Y02E 40/68* (2013.01)

(58) Field of Classification Search
CPC .......... H02H 7/001; H02H 9/023; H02H 7/00; Y02E 40/68; Y02E 40/69
(Continued)

(56) References Cited

U.S. PATENT DOCUMENTS

| 5,650,903 A * | 7/1997 | Gross ........................ H01F 6/02 |
| | | 361/141 |
| 6,900,714 B1 | 5/2005 | Huang et al. |
| 2012/0014030 A1* | 1/2012 | Ichiki ........................ H01F 6/02 |
| | | 361/141 |

FOREIGN PATENT DOCUMENTS

| DE | 10-2005-062581 B3 | 3/2007 |
| EP | 1612904 A2 | 1/2006 |

OTHER PUBLICATIONS

International Search Report for Application No. PCT/EP2014/063575 dated Oct. 9, 2014.

* cited by examiner

*Primary Examiner* — Dharti Patel
(74) *Attorney, Agent, or Firm* — Lerner, David, Littenberg, Krumholz & Mentlik, LLP

(57) ABSTRACT

An apparatus (100) for quenching at least part (110) of a superconductor in a superconducting state in reply to a quench signal to initiate a transition from the superconducting state into a normal-conducting state comprises: means (120) for providing an alternating (AC) current of a predetermined strength and/or predetermined frequency to the at least part (110) of the superconductor, wherein the means (120) for providing the AC current comprises a control terminal (130) configured to receive the quench signal. The means (120) for providing the AC current is configured to be activated in response of receiving the quench signal at the control terminal (130) so that the AC current flows through the at least part (110) of the superconductor, wherein the (Continued)

predetermined strength and/or the predetermined frequency is selected such that the transition from the superconducting state into a normal-conducting state is triggered.

14 Claims, 5 Drawing Sheets

(58) Field of Classification Search
USPC .......................................................... 361/19
See application file for complete search history.

AC-CURRENT INDUCED QUENCH PROTECTION SYSTEM

CROSS REFERENCE TO RELATED APPLICATIONS

The present application is a national phase entry under 35 U.S.C. § 371 of International Application No. PCT/EP2014/063575, filed Jun. 26, 2014, the disclosures of which are incorporated herein by reference.

FIELD OF THE INVENTION

The present invention relates to an apparatus and a method for quenching at least part of a superconductor and, more particularly, to an AC-current induced quench protection system.

BACKGROUND AND RELEVANT STATE OF THE ART

Superconductivity is a property of materials where the Ohmic resistance vanishes when the material is cooled below a critical temperature $T_C$ which depends, e.g., on the material. It plays a particular important role for applications involving very high current densities as, for example, for magnets used to generate strong magnetic fields. Such strong magnets are needed, for example, in magnetic resonance imaging (MRI), nuclear magnetic resonance (NMR), or in accelerators to guide a beam of charged particles.

To maintain the superconducting state, it is not only needed to keep the temperature below the critical value. In addition, a possible external magnetic field and a current flowing through the magnet have to be below respective critical values to maintain the superconducting state. Therefore, within a configuration space spanned by the temperature, the applied magnetic field and the current density, the transition between the superconducting/normal-conducting states is associated with a surface and traversing this surface will result in a phase transition where the superconducting property is lost.

It may happen that a particular portion of the superconductor undergoes a transition into the normal conducting state (e.g. when the temperature, the current density, and/or the applied magnetic field suddenly change locally). This situation is commonly referenced to as a quench. If a quench occurs in the coil of a superconducting magnet, the normal-conducting portion of the coil heats up due to localized Joule heating and may damage the superconductor in the case the temperature in the hotspot is increased too much. In order to prevent these severe consequences, protection systems are needed that detect a quench and, when a quench is detected, enable to quickly extract the energy stored in the magnet or to enhance the propagation of the normal zone (normal-conducting portion of the conductor) thus increasing the volume where the heat is deposited and decreasing the hotspot temperature.

In such protection systems two aspects should be considered: (i) to limit the hotspot temperature in the superconductor and (ii) to prevent high voltages to ground and across the coil. The respective target limits depend on the concrete application. For accelerator magnets, for example, a temperature target value may be 400 K, but the temperature should preferably be below 300 K (or below 100 K) to limit mechanical stresses in the coils. As for the prevention of high voltages, the voltage to ground will depend on the insulation design, for example, accelerator magnets at CERN use the following: less than 5 kV and from turn to turn of coils below 500 V and from layer to layer equal or less than 2 kV. Also these values vary over a large range depending on the application. Magnets used in accelerator applications may require a current up to tens of kA which has to be discharged in a few hundred milliseconds to limit the chance of damaging the system.

Conventional protection systems are, for example, energy extraction systems and quench heaters. The energy extraction system features a switch mechanism which is opened in the case of a quench being detected; the magnet current is thus forced through an energy extraction resistor, and is discharged exponentially with a time constant L/R, where R is the external resistance and L the inductance of the magnet. The total time needed to extract the current from detection, verification, power supply switching-off, and, finally, activation of the protection system is crucial for the magnet protection. The size of an extraction resistor, and thus the discharging time constant of the system, is limited by the maximum voltage allowed across it, $U=R \cdot I$. For some magnets, the ratio of inductance to resistance is such that it cannot be protected by an extraction resistor as the voltage gets too high to extract the current and protect the hotspot. In such a case, the magnet can be protected by alternative systems aimed at enhancing the quench propagation velocity and thus depositing the heat more homogeneously over the magnet coil.

Examples of such systems are the quench heaters, i.e. strips of normal-conducting metal glued to the insulation layers on the outside of the superconductor. When a quench is detected, the magnet is protected by applying a current throughout the quench heaters. The heat developed by Joule heating propagates, for example, in the adjacent cable and turns it to normal state. The aim is to induce a quench in the largest possible volume of the coil so that the energy is spread over the coil and the hotspot temperature is kept low. Nevertheless, quench heaters rely on the thermal diffusion across insulation layers, a process inherently inefficient, and may be significantly affected by highly efficient Helium cooling.

FIG. 5 depicts an example for an energy extraction resistor 410 protecting a coil 420 of a superconducting magnet arranged within a cryogenic area 430. In addition, a current source 440 and a switch 450 are connected to the coil 420 such that the switch 450 connects either the current source 440 in series to the coil 420 or, if quench has been detected, connects the resistor 410 in series to the coil 420. Therefore, if a quench is detected within the coil 420, the switch 450 disconnects the current source 440 and guides the current through the resistor 410 so that the resulting LR-circuit provides the exponential decrease of the current, thereby removing a large fraction of the energy stored in the magnet to avoid degrading of the magnet. In this circuitry for a given inductance L higher resistance R leads to a faster decay of the current, however, with the drawback that the voltage over the coil 420 gets higher.

On the other hand, the internal quench heaters rely on the heating of the superconducting magnet itself, thereby initiating also the transition in some remaining parts of the superconductor.

FIG. 6 depicts an example of such quench heaters acting on four coils 421, 422, 423, and 424. In this example, for each coil 421, 422, . . . a respective quench heater resistance 471, 472, . . . is provided inside the cryogenic area 430 to heat the respective coil in case a quench is detected. In addition to the quench heaters, each of these coils is also connected in parallel to a respective shunt diode 461, 462, 463 and 464. If a quench occurs in one of the coils 421, 422, . . . the voltage drop over the respective coil will increase, thereby allowing a current to flow over the shunt diode (because the voltage is above the forward voltage drop of the diode) and thus by-passing the current of the respective coil. Therefore, when the magnet quenches the voltage across the respective diode 461, 462, . . . opens the diode to connect the resistor and protects the magnet section by section. The plurality of coils 421 to 424 are again arranged within the cryogenic region 430 and are connected in series to a current source 440.

However, quench heaters transfer heat from the heater to the coil through insulation layers, a process which may be too slow to quench in time a fraction of magnet large enough to protect the magnet. A further problem is that the inductance of the magnet may be too large with respect to the available coil resistance which is a design problem and cannot easily be circumvented.

Quench heaters are a weak point in the magnet design because they need to be embedded in the superconducting coils separated by an insulation layer a few micrometers thick. Their presence increases the chances of electrical break-down, which is one of the most frequent causes of damage in a superconducting magnet. If the insulation between quench heaters and magnet coil is faulty, the quench heaters cannot be easily repaired and the whole magnet has to be replaced.

They are not well suited for the protection of particular superconducting magnets (e.g. based on an $Nb_3Sn$ manufacturing process). In addition, quench heaters can be easily placed only at particular locations on the magnet, typically in the outer region, and are therefore not appropriate to transfer heat in the whole coil and initiate a fast global quench in the magnet. Furthermore, tests have shown that further developments are needed to stop the heat from the quench heater being diverted into the helium bath away from the coil.

A further prior art solution uses a discharge pulse into the magnet to develop a high current pulse and so pushing the current above the critical value. The applied current pulse to the magnet also changes the magnetic field inside the superconductors, thus generating inter-filament and inter-strand coupling losses which deposit heat in the superconductor and increase the local temperature.

However, the new-generation high-energy superconducting accelerator magnets feature highly-efficient helium cooling and higher temperature margins. It became apparent, as a result of testing, that the standard quench protection was not well suited for the protection of such magnets.

Therefore, it is the object of the present invention to provide an apparatus and a method for quenching at least a part of the superconductor which is able to quench efficiently large portions of the magnet within a short period of time.

OVERVIEW OF THE PRESENT INVENTION

The aforesaid problems are solved by an apparatus for quenching at least part of the superconductor according to claim 1, a system according to claim 6, and a method for quenching at least part of the superconductor according to claim 12. Claims 2 to 5 and 7 to 11 and 13, 14 refer to specifically advantageous realizations of the subject-matter of the independent claims.

Accordingly, the present invention provides an apparatus for quenching at least part of a superconductor in a superconducting state in reply to a quench signal to trigger a transition from the superconducting state into a normal-conducting state. The apparatus comprises means for providing an alternating (AC) current of a predetermined strength and/or predetermined frequency to at least part of the superconductor, wherein the means for providing the AC current comprises a control terminal configured to receive the quench signal. The means for providing the AC current is configured to be activated in response of receiving the quench signal at the control terminal so that the AC current flows through all of or at least part of the superconductor. The predetermined strength and/or the predetermined frequency is selected such that the transition from the superconducting state into a normal-conducting state is triggered.

Therefore, the apparatus is configured to quench at least part of the superconductor so that a transition from the superconducting state into the normal-conducting state is initiated. This transition may be initiated as consequence of the temperature increase due to inter-filament and inter-strand coupling losses, or of trespassing of the critical current density in the superconductor.

Therefore, the means for providing the AC current and the part of the superconductor couple to each other, which, for example, may be given by a simple electrical connection between both. However, the current may or may not be injected directly into the part of the superconductor, wherein in the latter case the AC current is to be transmitted to the part of the superconductor. In addition, the AC current can either be generated by the means for providing completely independent of the superconductor, but the AC current may also be generated as a consequence of a capacitance and/or inductance of the superconductor itself so that the capacitive/inductive coupling between the means for providing and the superconductor will initiate the AC current that triggers the transition. The AC current may even be generating only within the part of the superconductor, e.g. by providing a respective external varying field inducing the AC current in the part of the superconductor. Therefore, the term "providing AC current" is to construe in a very broad sense in that it establishes a particular coupling that causes the generation of the AC current.

In further embodiments the superconductor is part of one or more (at least one) coils and the means for providing the AC current further comprises one or more capacitors so that upon receiving the quench signal the one or more coils and the one or more capacitors form at least one LC-circuitry (oscillating circuit) providing the AC current through the coil.

In this embodiment, the AC current is generated as consequence of the coupling between the one or more capacitors and the one or more superconducting coils. This embodiment provides the advantage, that already a single capacitor is sufficient to form the LC-circuitry to generate the desired AC current. In addition, a simple electrical connection to the one or more coils (or parts thereof) to the one or more capacitors is sufficient. It provides a simple solution without modifying the one or more coils which are typically arranged in a cryogenic area.

The AC current will be generated, because, if the coil becomes normal conducting, the voltage increases over the coil and this voltage may start to oscillate with a frequency set by the capacitance C of the capacitor and the inductance L of the coil. These oscillations may already be sufficient to generate a quickly varying magnetic field (by induction), but it may be of advantage to pre-charge the capacitor(s).

Therefore, further embodiments may comprise a means for charging the one or more capacitors. The means for charging is configured to pre-charge the one or more capacitors so that upon receiving the quench signal the pre-charged one or more capacitors discharge thereby initiating the AC current in the coil. To avoid an immediate discharge of the capacitors, a switch may be provided, which is configured to disconnect the pre-charged capacitor(s) from the coil(s). Therefore, further embodiments comprise an optional switch connected to the control terminal and configured to provide a current path between the one or more capacitors and the part of the superconductor upon receiving the quench signal.

The means for pre-charging the capacitor can either be an external voltage source, but the voltage may also be provided by the current source already being part of the respective system. For example, with the receipt of the quench signal, before the switch opens the current path to the coil, the one or more capacitors can be pre-charged. In particular, the pre-charged voltage should be sufficiently high in order to generate the predetermined strength of the AC current, which is needed to initiate the transition into the normal-conducting state. An advantage of having the one or more capacitors charged before the quench signal is generated, is that the response on a quench signal is very fast, because the capacitor(s) do not need to be charged first before an AC current can be provided to the superconductor.

The transition into the normal-conducting phase relies on the effect that, after the energy stored in the charged capacitor is discharged into the superconducting magnet, a fast and oscillating change of the transport current is generated and the resulting inter-filament and inter-strand coupling losses (between the filaments and the strands of a superconducting cable) are sufficiently high to heat the cable by few kelvins and initiate a fast quench in the superconductor. This effect is achieved, for example, by selecting the capacitance of the at least one capacitor accordingly.

In further embodiments the switch comprises at least one of the following components: a transistor, a thyristor combined with an antiparallel connected diode (i.e. the respective forward directions are opposite), and/or two antiparallel connected thyristors. Further embodiments comprise an optional resistor, which is configured to adjust the strength and/or the dumping of the alternating current. Thus, it can be ensured that the oscillations drop after the transition into the normal-conducting state An advantage of using thyristors and an antiparallel connected diode is that a thyristor can switch very fast, even large currents without any delay. Alternatively, a transistor, as for example a field-effect-transistor, may be used as a switch to provide a current path between the pre-charged capacitor(s) and the part of the superconductor.

Further embodiments relate to a system with an apparatus described before and a quench detector, which is configured to provide the quench signal if a quench is occurring in a portion of the superconductor. Therefore, the generated quench signal indicates that at least some portion(s) of the superconductor has gone into the normal-conducting state, so that the respective resistance strongly increases in the particular portion. The quench detector may, for example, generate the quench signal based on the resulting sudden voltage increase.

The quench detector may be configured to detect the quench not only in the particular part of the superconductor to which the means for supplying the AC current is connected, but may also detect a quench in different portions of the superconductor or a different part of the magnet. Therefore, quenching the part of the superconductor which is still superconducting provides a further Ohmic resistance so that the current flowing in the circuit is discharged more quickly and the generated heat is spread more homogeneously in the magnet coil, thereby decreasing the local heat deposition in the hotspot.

It may be desired to quench most part of the superconducting magnet, which may efficiently be done, when each layer of the corresponding magnet is quenched separately. This can be achieved by connecting a plurality (or each) of layers to a means for providing an AC current so that various adjacent layers can be quenched by a separate means for providing the AC current as defined before.

Therefore, further embodiments may comprise at least one magnet coil with a plurality of layers and a node along the connection between two of the plurality of layers, wherein the means for applying the AC current is connected to the node. Further embodiments comprise a plurality of means for proving the AC current, wherein each means for providing is connected to a respective node between two further layers of plurality of layers. Therefore, further AC current is provided to the two further layers, wherein at least one of the further layers being different from the two layers.

This provides the advantage that the whole magnet may be quenched within a short period of time to avoid the negative consequences of the hotspots. In particular, the resulting inter-filament and inter-strand coupling losses, mainly occurring in the high-field regions (layers) of the coil, are sufficiently high to heat the superconductor with a few Kelvins and initiate the quench in the superconductor. Therefore, these layers can be provided with a separate AC current.

In further embodiments the system is connectable to a current source. The current source comprises two connection terminals and the means for providing the AC current is connected between one of the two connection terminals and the node between the two adjacent layers. The two connection terminals of the current source may, according to further embodiments, be connected by two antiparallel diodes. The two antiparallel diodes provide a further safety mechanism if high voltage pulses are generated during the quenching process, in which case at least one of the diodes becomes conductive to carry the respective current to the ground terminal.

In further embodiments the system may be combined with quench heaters. For example, if the quench heaters do not sufficiently heat the part of the superconductor, the quenching by the AC current as set out before provides an additional heating system for the at least part of the superconductor. Therefore, the efficiency can further be increased. Alternatively, the system may be usable as a backup protection system in the case of break-down of the quench-heater electrical insulation, without the need of costly replacement of the magnet.

Embodiments relate also to a method for quenching at least part of a superconductor in a superconducting state in reply to a quench signal to trigger a transition from the superconducting state into a normal-conducting state. The method comprises the following steps: providing the quench signal to a control terminal; and in reply of receiving the quench signal at the control terminal, providing an AC current of a predetermined strength and/or frequency to the at least part of the superconductor, wherein the strength and/or frequency is selected such that a transition between the superconducting state into a normal-conducting state is initiated by the AC current.

Further embodiments comprise also methods wherein the functions provided by the features of the apparatus/system as explained before are implemented as method steps to achieve the desired effects.

The present invention provides the following advantages. At first, embodiments achieve a heat generation directly within the superconductor (without relying on quench propagation), a fast and global quench initiation, and a faster current decay (higher quench resistance). In addition, the insulation thickness is not a key parameter for the quench efficiency, because the heat does not need to diffuse through insulation layers. Moreover, more homogenous distribution of the energy within the magnet coils and lower hotspot temperature are obtained.

The amount of energy deposited in the magnet due to coupling losses is about the same at any current level, and embodiments are in particular suitable for inner layers (higher magnetic field) where it is normally more troublesome to place quench heaters. Embodiments are ideally suited to be integrated with quench heaters (as the latter works best in the outer layers). Finally, embodiments involve only a relatively low voltage to ground (e.g. 500-1000 V maximum for accelerator magnets), and can be implemented on a magnet as a back-up solution in the case its quench heater breaks without having to replace the magnet.

According to embodiments of the present invention, it is possible to bring as much of the superconductor as possible into the normal-conducting state so that in the resulting LR-circuit the resistive component of the coil reduces the time constant. By having a large volume of the coil resistive the energy is spread over the coil and the hotspot temperature is decreased.

It should be understood that the term superconductor refers to any type of conductor that can be placed in a superconducting state (i.e. it does not need to be in the superconducting state) and may comprise various geometries. For example, it may comprise a cable, one or more wires, a tape, a block of superconducting material (e.g. with a rectangular cross-section) or combinations thereof. It may also be formed as a cylinder and may be embedded as multiple filaments within non-superconducting material or within copper or aluminum. For example, a superconducting cable may comprise a plurality of twisted strands, each strand may comprise copper with a plurality of filaments embedded therein.

Furthermore, it is a particular advantage of the present invention that multiple oscillations deposit heat in the superconductor for more than a single pulse and thoroughly quench large parts of the magnet, typically more than the fraction achievable in conventional systems. In particular, there is no need to use high voltages in the capacitor. Instead, the system may use lower voltages because the oscillation provides heating for a longer period and there is no need to provide a very high current. Hence, the system keeps oscillating for many pulses. It primarily relies on the heat generated by coupling losses in the superconductors, which are roughly independent on the current level, and therefore works well even when the magnet current is well below the superconductor critical temperature. In addition, if the magnet current is close to the critical current, the system may be able to push the whole coil over the critical surface very efficiently.

DETAILED DESCRIPTION OF PREFERRED EMBODIMENTS

The features and numerous advantages of the apparatus according to the present invention will be best appreciated from a detailed description of the accompanying drawings, in which.

Figure 4:
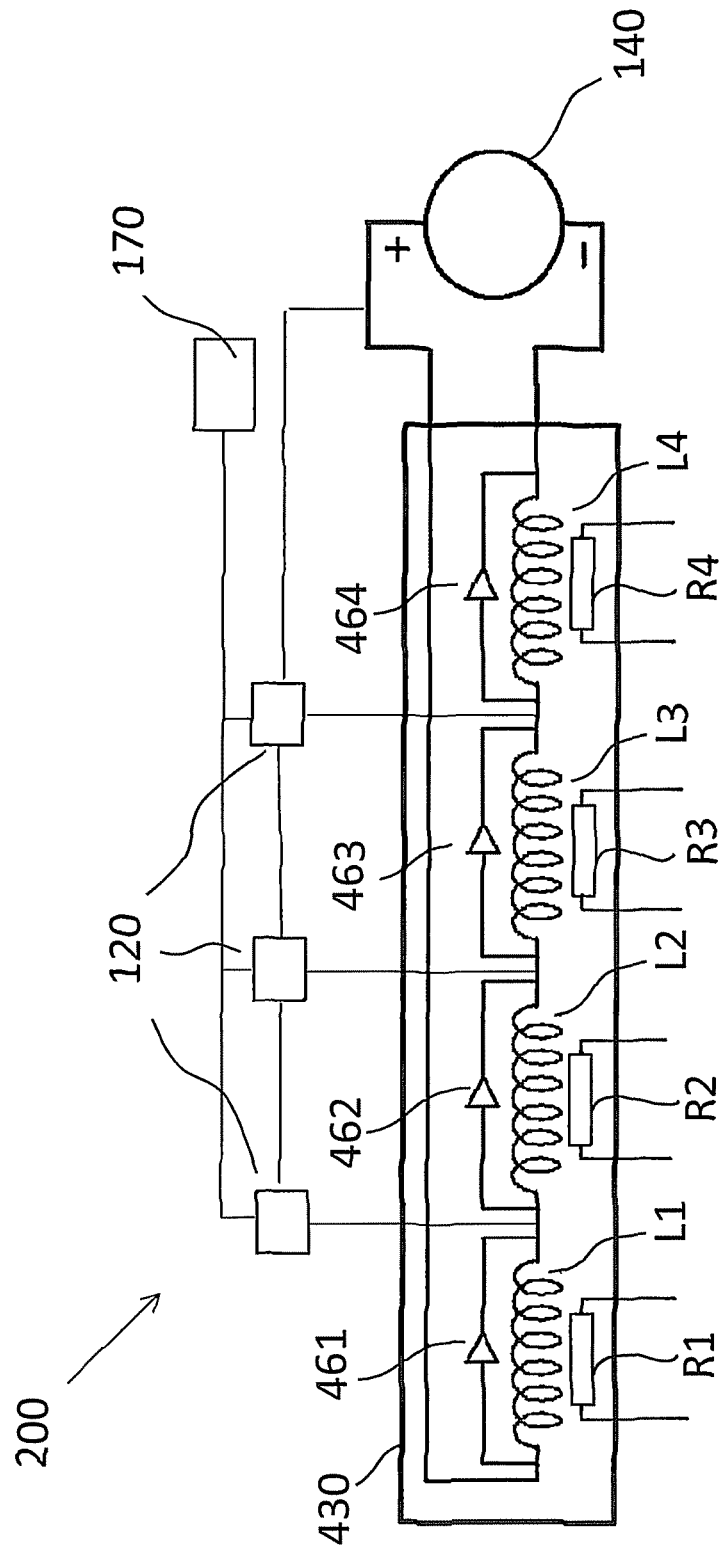
Figure 5:
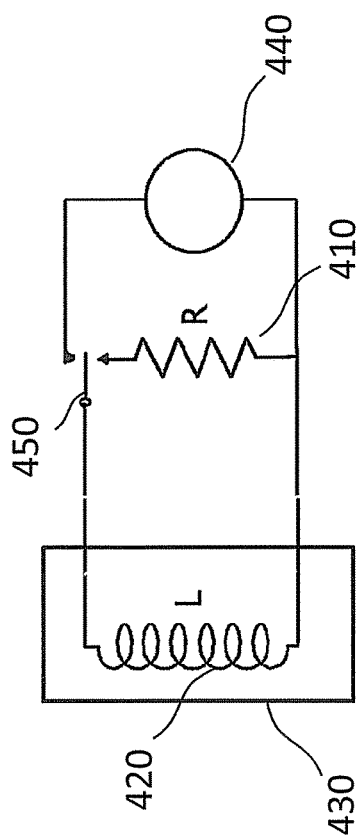
Figure 6:
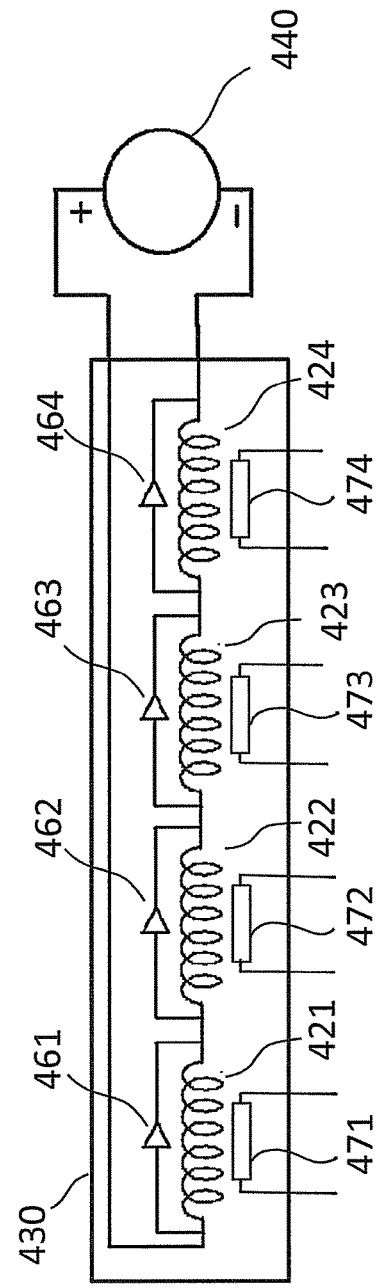

FIG. 4. depicts a combination of a quench heater with an apparatus according to the present invention;

FIG. 5 depicts an energy extraction system according to a conventional system; and FIG. 6 depicts a conventional quench heater.

Figure 1:
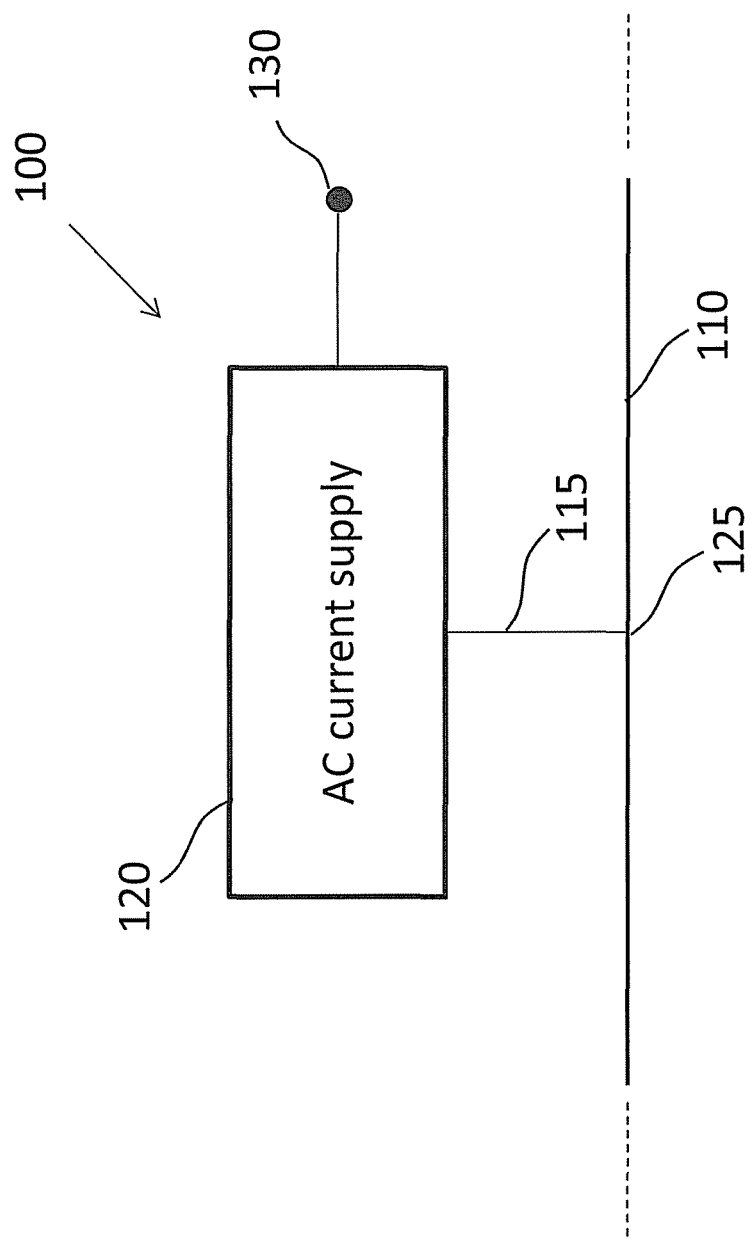
FIG. 1 is a schematically view of an apparatus according to an embodiment.

FIG. 1 depicts an apparatus 100 according to an embodiment of the present invention for quenching at least part of a superconductor 110 in reply to a quench signal to trigger a transition from the superconducting state into a normal-conducting state. In this example the superconductor 110 is a superconducting coil composed of two coils 112 and 114 powered in series. The apparatus 100 comprises a means for providing an alternating current 120, which is configured to provide the alternating current in a predetermined strength (and/or a predetermined frequency) to the at least part of the superconducting coil 110. Therefore, the means 120 is connected to the superconducting coil 110, for example, with a wire 115 which connects the superconducting coil at a node 125. Moreover, the means for providing the alternating current 120 comprises a control terminal 130 which is configured to receive the quench signal, wherein the means 120 is activated in response of receiving the quench signal at the control terminal 130 so that the AC current of the predetermined strength flows through the wire 115 to at least part of the superconducting coil 110. The strength (and/or the frequency) of the AC current is selected such that the transition from the superconducting state into the normal-conducting state is initiated, thereby increasing the resistance of the superconducting coil (i.e. quenching same).

Figure 2:
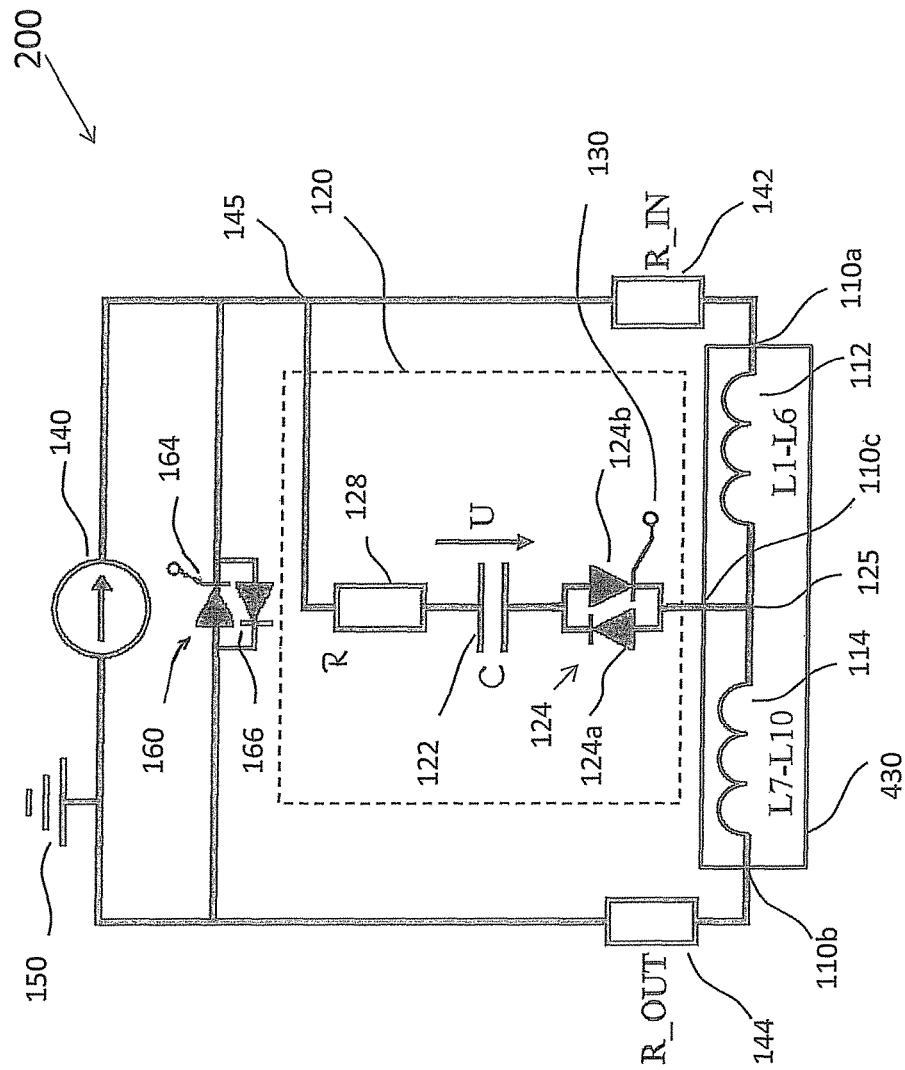
FIG. 2 depicts a further embodiment based on an external capacitor and a diode/thyristor switch.

FIG. 2 depicts a further embodiment of the present invention, wherein the means for providing the alternating current 120 comprises a switch 124, a capacitor 122 and a resistor 128. The switch 124 may comprise, for example, a diode 124a connected antiparallel to a thyristor 124b which comprises the control terminal 130. The resistor 128 is optional or may simply reflect the resistance which is always present in any circuitry when in a normal-conducting state. The means for providing the AC current 120 is connected to the node 125 between a first coil 112 and a second coil 114 along the at least partly superconducting coil 110, wherein the switch 124 is arranged between the node 125 and the capacitor 122, which in turn may be arranged between the switch 124 and the optional resistor 128 with a resistance R. Therefore, the forward direction of the thyristor 124b may be directed from the capacitor 122 towards the node 125. Accordingly, the forward direction of the diode 124a may be directed in the opposite direction from the node 125 towards the capacitor 122. The first and second coils 112, 114 may form parts of one magnet. For example, the first coil 112 may comprise the layers L1 to L6 and the second coil 114 may comprise the layers L7 to L10 so that all layers L1 to L10 may constitute one magnet which is arranged within the cryogenic area 430. The cryogenic area 430 comprises a first terminal 110a, which is configured to provide a first connection the first coil 112, a second terminal 110b, which is configured to provide a second connection to the second coil 114, and a third terminal 110c, which is configured to provide a connection to the node 125.

The first and second part 112, 114 should be understood broadly in that it can denote any portion of a coil or magnet so that the node 125 is placed at an internal point of the coil or magnet and the superconductor extends in both direction (upstream and downstream of the current from the current source 140), i.e. the AC current is injected at an internal point of the coil or magnet. In further embodiments the node 125 or a further node for injecting AC current may also be placed at the beginning or end of the coil or magnet (with respect to the current of the current source 140).

The system as depicted in FIG. 2 further comprises a current source 140 with two terminals, one of which is connected to a ground terminal 150 and the other is connected via a first resistor 142 to the first terminal 110*a* and thus to the first coil 112 on the side opposite to the node 125. The second coil 114 is connected on the side opposite to the node 125 to the ground terminal 150 via the second terminal 110*b* and a second resistor 144. The first resistor 142 and the second resistor 144 are optional and may not be formed as separate circuit elements, but may simply reflect the resistance within the conductors used in the normal-conducting state (the superconductor within the cryogenic area do not comprise a resistance).

The means for providing the AC current 120 is connected between the node 125 via the third terminal 110*c* and a further node 145 along the conducting path between the current source 140 and the first resistor 142 or the first terminal 110*a* (at an end opposite to the node 125). In further embodiments the means for providing the AC current 120 is connected between the node 125 and another node along the line between the current source 140 and second resistor 144 or second terminal 110*b* (at an end opposite to the node 125).

In further embodiments the further node 145 may also be part of the magnet which may or may not be in the superconducting state. Therefore, also the further node 145 can be inside the cryogenic areas 430. In such embodiments the extraction and injection of the AC current is between two points of the superconductor. The two points may be separate points of the magnet (e.g. on different layers) or of different magnets or coils.

Optionally, the current source 140 comprises a by-pass line with a protection circuit 160 which, for example, may be formed by two antiparallel diodes: a first diode (or a thyristor) 164 and a second diode 166. The first and second diodes 164, 166 are configured such that the current source is protected in the case of inverse current by the means of providing the AC current. If the first diode 164 is a thyristor as depicted in FIG. 2, a control terminal is provided that opens the current path accordingly when a signal is provided (e.g. only if inverse currents are expected).

The capacitor 122 may be pre-charged with a voltage (e.g. by a means for charging the capacitor) of a predetermined value U. Therefore, when a valid quench signal is provided to the control terminal 130 the thyristor 124*b* becomes conductive in one direction to connect the charged capacitor 122 with the at least part of the superconducting coil 110. The anti-parallel (or reversed) diode 124*a* provides a current path in the opposite direction so that the discharging capacitor 122 initiates oscillations of the current for several cycles. Effectively, the first and/or second coils 112, 114 in combination with the capacitor 122 form an LC-oscillating circuit so that the AC current is provided to the at least part of the superconducting coil 110. The AC current is provided with a pre-determined strength and/or predetermined frequency because the capacitor is charged with a predetermined voltage and comprise a predetermined capacitance C, which are selected such that the AC current is able to quench the magnet, i.e. the AC current has to be strong enough to exceed the critical current density and/or to induce a magnet field exceeding its corresponding critical value in the superconducting parts of the coil and/or to induce coupling losses inside the superconductor large enough to increase the local temperature over the critical limit.

Therefore, if the thyristor 124*b* is activated by the quench signal, the current flows and a current pulse is created (positive pulse in one magnet half, negative pulse in the other). The high current-change in the magnet superconducting coil generates coupling losses (=heat) and eventually rise the temperature of the superconductor enough to make it quench. Since the thyristor allows the current flow only in one direction the reverse diode is connected in parallel to the thyristor but in reverse direction so that the current can flow back in the capacitor. The reverse diode mounted across the discharging thyristor achieves the effect to provide an oscillating current back and forth in the two parts of the magnet, continuously generating coupling losses due to the induced magnetic-field change.

The capacitor 122 can be pre-charged with an optimal value, for example from 10 to 1000 V.

Examples for the magnets according to embodiments of the present invention include: Nb—Ti; Nb3Sn (with more coupling losses than Nb—Ti); high temperature superconducting magnet (HTS); high current magnets with high current density; Superconducting solenoids.

Figure 3:
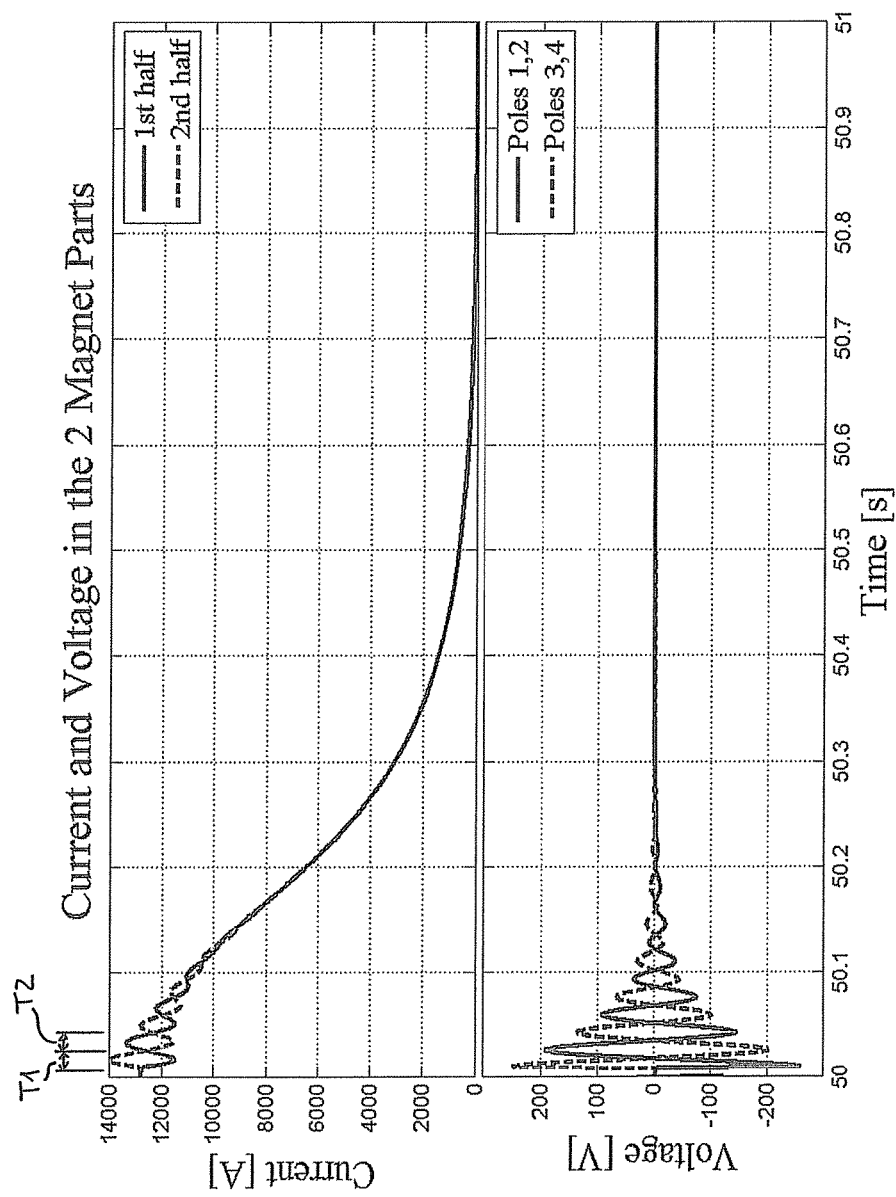
FIG. 3 depicts the drop of the current and the voltage by using embodiments of the present invention.

FIG. 3 depicts the current and voltage drop after a quench has occurred by applying the AC current to the node 125 thereby quenching not only the first coil 112 but also the second coil 114 (because the current will be directed in either way). For example, the current drops exponentially to zero while oscillating heavily when the switch 124 opens upon receiving the quench signal applied to the control terminal 130. The oscillations are such that the current, for example, in the first coil 112 (denoted as $2^{nd}$ half and depicted as dashed line) increases in a first oscillation period T1, while in the second coil 114 it decreases (denoted as $1^{st}$ half and depicted as solid line). For the next oscillation (the second oscillation period T2) the situation is reversed, i.e. the current in the first coil 112 decreases while the current in the second coil 114 it increases. This process continues with damping of the oscillation. The oscillations are about the mean value, which approach asymptotically a zero current which is in FIG. 3 already after about 0.6 s. Therefore, the oscillation is damped and approximate eventually the current supplied by the current source 140 which is exponentially discharged.

The capacitor 122 was pre-charged with a particular strength (e.g. 200 V) so that the AC current causes a quench in the magnet, i.e. the induced coupling losses inside the superconductor are large enough to increase the temperature over the critical limit. Therefore, the sudden increase in the current in the first coil 112 in the period T1 followed by a sudden increase in the second coil 114 in the second oscillation period T2 is arranged such that the current density is pushed closer to its critical limit in both parts alternatively. This process is very efficient, since the magnets may be run at 80% of the respective critical value of the current.

FIG. 3 depicts also the voltage oscillations (lower graph). As long as the superconducting state is present the resistive voltage drop across the first coil 112 and the second coil 114 is zero. However, after closing the switch 124 the voltage increases/decreases with the frequency of the alternating current in correspondence to the voltage U with which the capacitor was pre-charged. Again, the first coil 112 and the second coil 114 have opposite phases of the oscillating voltage applied thereto. Again, the voltage fluctuations across the first coil 112 (denoted as Poles 3, 4) are depicted as dashed line, wherein the voltage across the second coil 114 (denoted as Poles 1, 2) are again depicted by a solid line.

Therefore, these embodiments use dB/dt and dI/dt AC losses with an oscillating current superimposed over the magnet transport current. The losses that heat the superconductors are generated by the high magnetic-field change in the superconductors. In particular, this system keeps oscillating for many pulses and at high magnet current may push the current density above the superconducting surface. However, the inventive concept is also usable down to very low magnet current where it is generally difficult to quench the magnet. Tests have shown that in many cases one pulse at low magnet current may be insufficient to quench the magnet.

In further embodiments, the system 200 as depicted in FIG. 2 can be combined with an energy extraction system and/or quench heaters as shown in FIGS. 5 and 6, wherein the quench heaters again may comprise quench heater resistances which may be combined with diodes connected in parallel to the first coil 112 and the second coil 114 and a further switch may be provided between the current source 140 and either the first terminal 110a or the second terminal 110b, thereby interrupting the current supply from the current source 140 while connecting the first and the second terminals 110a, 110b to a dump resistor thereby extracting the energy externally of the superconducting magnet. Therefore, resistors and diodes can be mounted across small sections of the coil and the quench heaters heat the superconductor from the outside through the insulation layer.

FIG. 4 depicts an embodiment for this realization, wherein the quench heater or quench heater resistances R1, R2, . . . , as for example shown in FIG. 6, is combined with a plurality of means 120 for providing an AC current. In particular, the embodiment as depicted in FIG. 4 comprises a magnet with four layers L1, L2, L3, L4 and nodes between adjacent layers are connected to a respective means 120 for providing an AC current so that an AC current is injected at each connection between the adjacent layers L1, L2, L3, and L4. The four layers in FIG. 4 represent only an example, as the magnet may comprise more layers. In addition, the layers may also be coils which are part of a larger magnet. In addition, for each layer L1, L2, L3 and L4, a respective quench heater resistance R1, R2, R3 and R4 is provided inside the cryogenic area 430. For example, the quench heater resistance R1, R2, R3 and R4 can be provided as close as possible to the superconductor to have strong thermal coupling and may be heated by a separate circuitry which is not shown in this figure. Therefore, when a quench is detected, the quench heater resistances R1, R2, . . . can be employed to heat the respective layers L1, L2, . . . which may or may not be in the superconducting state in order to quench large portions of the magnet. In further embodiments the quench heater resistances are provided only for some of the layers (e.g. for the outer layers).

The layers L1 to L4 comprise each a by-pass with a respective diode 461, 462, 463 and 464 so that if one of the layers quenches the current is directed along the bypass with the respective diode 461, 462, . . . so that the respective layer, where the quench has occurred, is not subject to a large current which could otherwise destroy the respective layer by the generated heat. However, the AC current may not only be provided to the layers where no quench has yet occurred, but may also be provided to the layers where, for example, a quench has already occurred. Hence, the whole layer and not only the particular portion of the layer, where the quench has occurred, is turned into normal-conducting state.

The pluralities of means for providing 120 are further connected to one of the terminals of the current source 140. In the embodiment as shown in FIG. 4 it is the positive voltage terminal, but in other embodiments it may also be connected to the negative voltage terminal. Moreover, a quench detector 170 is connected to the plurality of means for providing 120 so that a quench signal generated by the quench detector 170 will, e.g. simultaneously, activate the plurality of means for providing 120 so that all four layers L1 to L4 are subject to AC currents flowing through these layers of the magnet. An alternative embodiment features a delay in the activation of some of the means of providing 120.

The plurality of means for providing 120 may or may not differ in that the capacitors, as for example shown in FIG. 2, are different or equal for each of the means for providing 120 so that the strength and/or the frequency of the provided AC currents can be adjusted for the various layers as needed. For example, inner layers of a magnet can be subject to a stronger or weaker AC current, i.e. the current strength may be higher/lower or the frequency is higher/lower, when compared to the outer layers which are quenched more easily by other methods. In this way, some or all of the layers of a particular magnet can be quenched at the same time and the means for providing the AC current can be adjusted as needed to have a most efficient quenching for the whole magnet within a short period of time (preferably below 50 milliseconds or below 20 milliseconds).

In further embodiments the capacitors 122 in the different means for providing 120 can be charged with different polarities and/or the switches 124 in the different means for providing 120 can be switched (closed) not simultaneously, but the timing of the switching and/or the polarities of the capacitors can be selected such that a superposition of the injected pluralities of AC-currents provide an optimized quenching by the resulting AC-current. For example, the resulting AC-current the timing and the polarities may be selected to provide an amplification for the resulting AC current.

Hence, further embodiments relate also to a battery of capacitors that may be used instead of only one. Each of the additional capacitors can be connected between adjacent layers over respective switches as the one depicted in FIG. 2. Thus, more connections can be provided to the magnet so that the several capacitors may provide a discharge at several different points. In addition, the voltages provided by the capacitor may be low, because the oscillation provides heating for a longer period and there is no need to push current so high.

In addition, the circuitry as depicted in FIG. 4 may comprise further diodes and resistors connected to by-pass the mainstream of the magnet and to bring down the current by means of an energy extraction system.

Therefore, the protection system for superconducting magnets according to embodiments comprises also a combination of the novel capacitive discharge system and quench heaters attached to the coil winding surfaces. The quench heaters may be activated simultaneously to heat up the outer low-field region of the coil. The advantage of this hybrid protection system is a global quench initiation, resulting in a much faster current decay and hence a lower hotspot temperature.

As for the other embodiments, the capacitors are charged with an independent circuit, but can be connected with any polarity (also with reverse polarity when compared to the previous embodiments).

The present invention provides the following advantages. The reverse diode (see FIG. 2) allows the continued oscillation of the current at high dB/dt that induces continued heating through inter-filament and inter-strand coupling losses inside the superconductor. It works at all current levels and the superconducting coil can be quenched faster than by using quench heaters. In addition, a significantly larger percentage of the coil than for quench heaters is quenched. Moreover, it quenches volumes in the coil that have not been reliably quenched in the conventional magnets, namely the inner high-field regions of the magnets where it is more difficult to place quench heaters. It uses no "real-estate" in the magnet leading to more efficient magnet designs. The technology is more robust than the current quench heater systems which occasionally fail. It can be mounted at room temperature and is therefore easily replaced. Since a protection for longer high-field magnet is currently not available, it could help optimize the design by freeing up design space.

Embodiments provide further significant advantages over the performance of the conventional quench heaters. For example, quench heaters typically quench only small superconductor volume (<=50%); they need to transfer heat from the heaters to the coil through insulation layers, a process inherently slow; they are typically placed in the outer layers of the magnet, with lower magnetic field, so that the quench propagation is slower. Since embodiments of the present invention superimpose an AC current to the circuit, injected by a capacitor (or a battery of them), the varying magnetic field will cause coupling losses in the superconductor inducing quench in the magnet. Therefore, not only does the method allow quenching a larger volume of the conductor, it also does that faster, because the heat comes from inside the superconductor and no time is lost in the heat transfer from heater to coil. The voltage to ground, when used in the accelerator applications, may be in the range of 500-1000 V. The energy is distributed more homogeneous within the magnet coils, due to a global quench initiation. The system is not integrated in the magnet as for the quench heaters so that it can be used as a backup solution in the case the quench heaters fail without having to replace the magnet itself.

Further aspects of the present invention can be summarized as follows.

By using a quench protecting system according to embodiments, all types of superconducting magnet can be protected (e.g. also Nb3Sn magnets) and it delivers heat efficiently to most of the volume of the magnet to protect it. In addition, the system can be mounted without extracting the magnet from the tunnel and may protect also high $T_C$ materials, which are otherwise difficult to protect. Also high field NMR magnets are difficult to protect, and use conventionally expensive and very sophisticated systems. Embodiments of the present invention can be retro fitted to old systems and are potentially less expensive than existing systems.

An optimized system has, therefore, the potential to be simply connected to any of the matching section or stand-alone large accelerator magnets and protect the magnets. This could stop the need to extract a magnet from the tunnel and replace it with a spare, resulting in months of shut-down time. HTS magnets have high temperature margins and the invention may quench coils composed of such materials. The quench heaters could then be used to keep the coil quenched as the HTS recovers fast. High field NMR, hybrid systems are difficult to protect by conventional means. The system according to embodiments works well as an active system, as in HTS, Nb3Sn, Nb—Ti, all used in NMR magnets.

The parameters of the inventive concept are: the capacitive discharge, dI/dt; dB/dt; interfilament and inter-strand coupling losses; and the quench (Ohmic loss). The capacitive discharge depends on the inductance L of the protected elements, capacitance C of the capacitive-discharge unit, the charging voltage of the capacitive-discharge unit, and the resistance R of the capacitive-discharge unit. These values fix the oscillation frequency of the AC current, the damping of the oscillations and the maximal voltage to ground. The time derivatives dI/dt and dB/dt determine the magnetic field in the superconductor (roughly dB/dt~f*dI/dt for steady-state dI/dt). The time fluctuations may be, e.g., 150 kA/s. The coupling losses depend on the properties of the superconductor and its arrangement (cable, wire, tape, etc.) as the filament twist pitch, strand twist pitch, strand "diameter", number of strands in the cable, RRR (ratio of resistances at room temperature and at the critical temperature), and the magnetic field. The quench depends also on the properties of the superconductor and its arrangement (strand cross-section, copper/superconducting cross sectional ratio, RRR, coil length, magnetic field) and on the external cooling.

The values can be selected in a broad range depending on the concrete situation. Without any limitation, the following values have been tested for accelerator magnets: L=8 mH, C=28.2 mF, U=500 V, I=12.8 kA. After a time of about 100 ms virtually 100% of the magnet coil was quenched at a nominal current. Even assuming a detection time of 20 ms, the hot-spot temperature remains <200 K. In a second tested example, L=50 mH, C=28.2 mF, U=1000 V, I=12.8 kA and the magnet was 10 m long. In a third example, L=460 mH, C=4.7 mF, U=300 V, I=400 A (for a solenoid to be tested). After a time of about 20 ms virtually 100% of the magnet coil was quenched. These values depend on the particular application and should not be understood as limitation. For example, the current may vary between 0-15 kA, the inductance may be between 0.5 mH-10 H, the voltage may be between 50-1000V and the capacitance may be between 0.5 mF-100 mF. However, in further embodiments even broader ranges are possible.

Embodiments are, in particular, suitable for the new generation of high-field Nb3Sn-based superconducting accelerator magnets that pose a challenge concerning the protection of the magnet coil in the case of a quench. The stored energy has to be absorbed by the coil windings' enthalpy. The very high stored energy per unit volume requires switching practically the entire coil windings pack to the normal state within typically 10-30 ms in order to avoid damage due to overheating. It is very challenging to homogeneously distribute the heat generated after a quench for which a very powerful quench heating system is required.

Different kinds of magnets where the invention could be applied include, for example, large accelerator magnets, NMR high field, high-current magnets with high current density, detector magnets or cryo-stable magnets, and any magnet with internal diode/resistor protection. Actually, most conventional systems can be configured to use the present invention, because no additional internal structures are needed. Embodiments of the present invention may also be applied to superconducting solenoids; the various turns of a solenoid are strongly coupled, i.e. a change in the current in the two parts of a solenoid will induce large magnetic-field changes in the superconductor, which is extremely effective.

Whenever the described embodiments refer to a connection, it is always understood that this may or may not refer to a direct connection. The connection may also only refer to a current path established between the connected components.

In addition, further embodiments include also alternative electrical designs that produce the same oscillating effect (instead of a thyristor+a reverse diode). This may include for example: a thyristor+a reverse thyristor; a switch; and there may be more.

The system can be optimized with respect to the superconductor properties and the oscillation frequency; one configuration can be more efficient than the others. Moreover the method can be applied to superconducting coils, magnets, and solenoids and quenches a larger volume of conductor, very fast. As the heat comes from inside the metal of the superconductor no heat and time are lost in the transfer from heater to coil.

As for the percentages of quenched coil, values of the time-constant of a current discharge, etc. and the fact that embodiments quench more superconductor than other systems, it is understood that the values involved and the performance of the different systems change from case to case.

The embodiments described above and the accompanying drawing merely serve to illustrate the subject matter of the present invention and the beneficial effects associated therewith, and should not be understood to imply any limitation. The features of the invention, which are disclosed in the description, claims and drawings, may be relevant to the realization of the invention, both individually and in any combination.

LIST OF REFERENCE SIGNS 100 apparatus for quenching
110 part of a superconducting coil
112, 114 one or more coils
115 connection line between AC source and superconductor
120 means for providing an AC current
122 one or more capacitors
124a reversed diode
124b thyristor
125 connection node
128 resistor
130 control terminal
140, 440 current source
142, 144 in out-resistors
160 by-pass switch
164, 166 diodes
170 quench detector
200 system
L1, L2, . . . plurality of layers
R1, R2, . . . plurality of quench heater resistances
410 resistor
420 inductor
430 cryogenic area
450 switch
461, 462, . . . by-pass diodes
471, 472, . . . heater resistances

The invention claimed is:

1. An apparatus for quenching at least part of a superconductor composed of at least two coil portions powered in series in a superconducting state in reply to a quench signal to initiate a transition from said superconducting state into a normal-conducting state, the apparatus comprising:

means for providing an alternating current of a predetermined strength and/or predetermined frequency to said at least part of said superconductor, wherein said means for providing said alternating current comprises a control terminal configured to receive said quench signal, wherein said means for providing said alternating current is configured to be activated in response of receiving said quench signal at said control terminal so that said alternating current flows through said at least part of said superconductor, wherein said predetermined strength and/or said predetermined frequency is selected such that said transition from said superconducting state into a normal-conducting state is initiated, and wherein said transition is initiated primarily by heating of the superconductor due to said alternating current.

2. The apparatus according to claim 1, wherein said means for providing said alternating current further comprises at least one capacitor so that upon receiving said quench signal at least one coil portion and said at least one capacitor form at least one LC-circuitry, which is configured to provide said alternating current through said at least one coil portion.

3. The apparatus according to claim 2, further comprising a means for charging said at least one capacitor and a switch electrically connected between said at least one capacitor and said at least part of said superconductor, said means for charging is configured to pre-charge said at least one capacitor, wherein said switch comprises said control terminal (130) so that upon receiving said quench signal said at least one capacitor is discharged, thereby initiating said alternating current in said at least one coil portion.

4. The apparatus according to claim 3, wherein said switch comprises at least one of the following components: a transistor, a thyristor combined with an antiparallel connected diode, and two antiparallel connected thyristors.

5. The apparatus according to claim 1, further comprising a resistor, which is configured to adjust a dumping of said alternating current.

6. A system comprising:
at least one apparatus according to claim 1;
at least one quench detector, which is configured to provide a quench signal indicative of a quench in at least one portion of a superconductor.

7. The system according to claim 6, further comprising at least two coil portions powered in series, wherein said at least two coil portions comprises a plurality of layers and a node along a connection between two of said plurality of layers, wherein said means for providing said alternating current is connected to said node.

8. The system according to claim 7, wherein said at least one apparatus comprises a first apparatus with a first means for providing a first alternating current and a second apparatus with a second means for providing a second alternating current, said plurality of layers comprise two adjacent layers and two further adjacent layers, wherein at least one of said two adjacent layers differs from said two further adjacent layers,
and wherein said first means for providing is connect to a first node on a connection between said two adjacent layers so that said first alternating current is provided to said two further layers and said second means for providing is connected to a second node on a connection between said two further adjacent layers so that said second alternating current is provided to said two further adjacent layers.

9. The system according to claim 7, which is connectable to a current source, said current source comprising two connection terminals and said at least two coil portions are connected between said two connection terminals, wherein said means for providing said alternating current is connected between one of said two connection terminals and said node.

10. The system according to claim 9, further comprising a protection circuit provided between said two connection terminals or the current source and comprising two antiparallel diodes.

11. The system according to claim 7, further comprising a quench heater connected to further layers of said plurality of layers, wherein said two layers of said plurality of layers are arranged inside said further layers.

12. A method for quenching at least part of a superconductor composed of at least two coil portions powered in series in a superconducting state in reply to a quench signal to initiate a transition from said superconducting state into a normal-conducting state, said method comprising:

providing said quench signal to a control terminal of a means of providing an alternating current; and in reply of receiving said quench signal at said control terminal, providing an alternating current of a predetermined strength and/or of a predetermined frequency to said at least part of said superconductor, wherein said predetermined strength and/or said predetermined frequency is selected such that a transition between said superconducting state into a normal-conducting state is initiated by said alternating current, and wherein said transition is initiated primarily by heating of the superconductor due to said alternating current.

13. The method of claim 12, further comprising a step of pre-charging at least one capacitor before said quench signal is received, and wherein the step of providing said alternating current is performed by discharging said at least one capacitor in at least one coil portion.

14. The method of claim 13, further comprising said step of providing a current path between said at least one capacitor and said at least two coil portions by activating a switch in reply of receiving said quench signal.

* * * * *